Nov. 21, 1939.   H. G LEHMANN   2,180,711
CIGAR LIGHTER
Filed Aug. 14, 1936   2 Sheets-Sheet 1

INVENTOR
Herbert G. Lehmann
BY
ATTORNEY

Nov. 21, 1939. H. G. LEHMANN 2,180,711
CIGAR LIGHTER
Filed Aug. 14, 1936 2 Sheets-Sheet 2
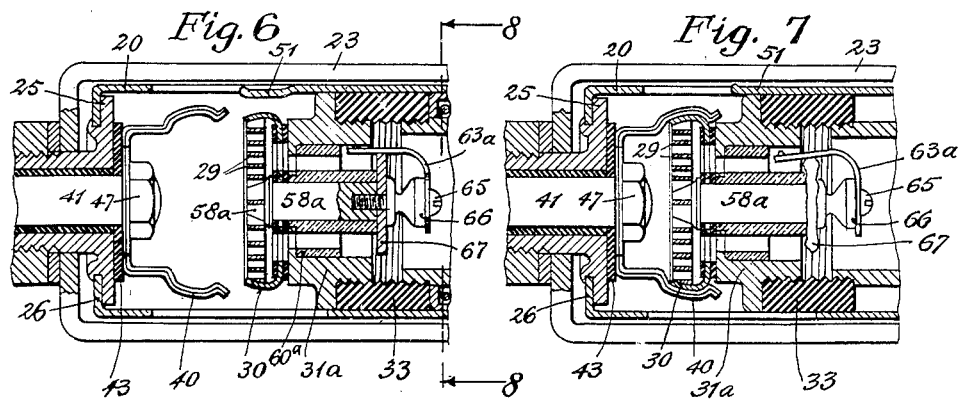
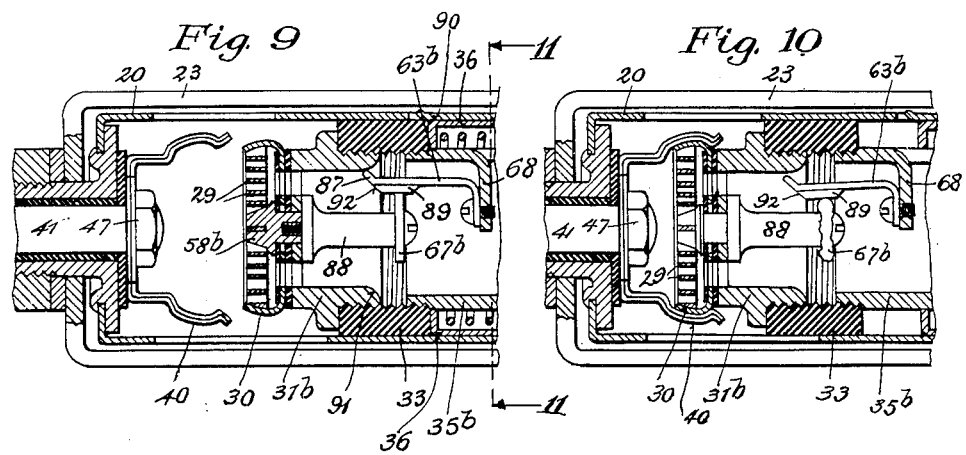
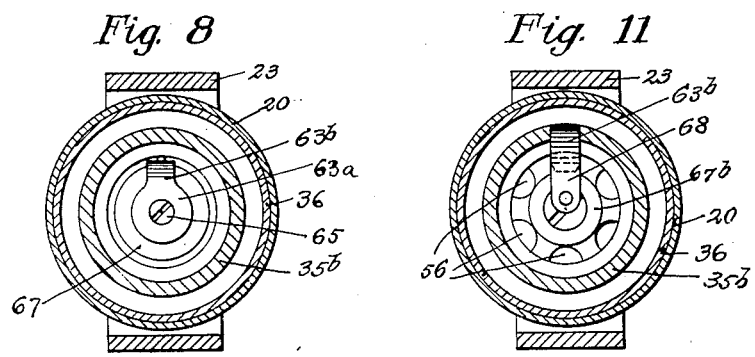
INVENTOR
Herbert G. Lehmann
BY
ATTORNEY Patented Nov. 21, 1939

2,180,711

UNITED STATES PATENT OFFICE 2,180,711

CIGAR LIGHTER

Herbert G. Lehmann, Bridgeport, Conn., assignor to Automatic Devices Corporation, Bridgeport, Conn., a corporation of Connecticut Application August 14, 1936, Serial No. 95,951

16 Claims. (Cl. 219—32)

This invention relates to electric cigar lighters. More specifically it is an improvement over that form of automatically controlled cigar lighter shown in the copending application, Serial No. 93,770, filed August 1, 1936 by Joseph H. Cohen.

In the majority of such devices, there has always existed the danger of fires being caused by overheating of the heating element when the energizing circuit has been allowed to remain connected to the element for too long a time. In such event, objects in the vicinity of the heating element, whether they are parts of the cigar lighter or adjacent articles, are made so hot that they begin to smolder or burn. This condition of overheating can be caused by failure of the user to open, or to permit to open, the circuit through the heating element, or caused by failure to function of the automatic circuit-opening mechanism, in such devices as are so intended to operate.

This danger and disadvantage in prior lighters is obviated by the present invention by the provision of improved means for opening the heating element circuit in response to dangerous overheating of said element, said means being characterized by a thermoplastic member or structure, and by a switching mechanism opening the circuit as a result of softening of the thermoplastic material. As provided by the invention, the improved means includes a thermoplastic means, and includes means for opening the circuit when the thermoplastic means becomes soft, and also includes means for causing the thermoplastic means to become soft when the heating element becomes dangerously hot. The operation of the various parts is such that the softening of the thermoplastic means and the consequent opening of the circuit takes place before dangerous heat can be transferred to adjacent objects.

A feature of the invention is the positive action which characterizes opening of the circuit, as effected by the thermoplastic and switch means. In one embodiment, a contact-bridging member in the heating element circuit is held in place against a pair of contacts, and under tension, by a meltable member; overheating of the heating element will cause softening of the meltable member, whereupon the bridging member will snap out of place, opening the circuit. In other embodiments, a spring switch arm, normally biased to open the heating element circuit, is held in closed-circuit position by a meltable element, and softening of the element effected by overheating of the lighter results in the switch arm springing to open-circuit position.

The present invention is shown as applied to an automatically operated cigar lighter by way of illustrative example; it should be understood however that the invention has utility with other types of lighters, whether or not automatic in operation.

Other features and advantages will hereinafter appear.

In the accompanying drawings, showing several embodiments of the invention:

Figure 4:
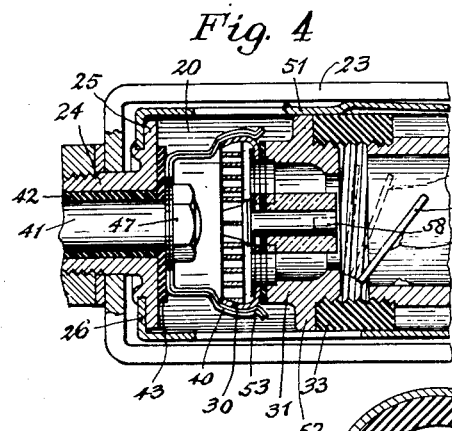
Figure 3:
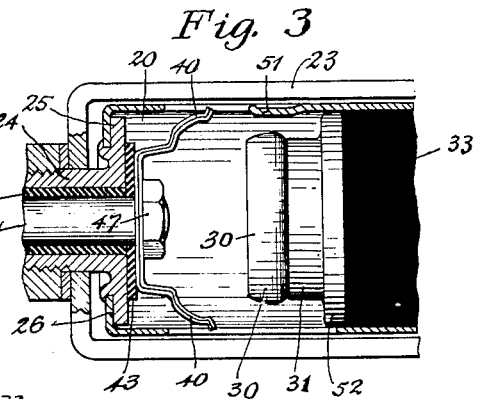
Fig. 3 is a fragmentary sectional view showing the igniting unit as having returned to its open-circuit position by release of the thermostatic contact clip in response to heat from the heating element, this illustrating the operation of the lighter under normal conditions.

Fig. 4 is a fragmentary section showing the igniting unit in energizing position and the heating element overheated to a dangerous degree, due to failure of the bimetallic contact clip to function properly, and showing the contact-bridging member of the igniting unit as having been released due to softening of the meltable fastening element, said contact-bridging member, due to the tension under which it was held, springing away from the contacts and thereby opening the circuit of the heating element.

Figure 2:
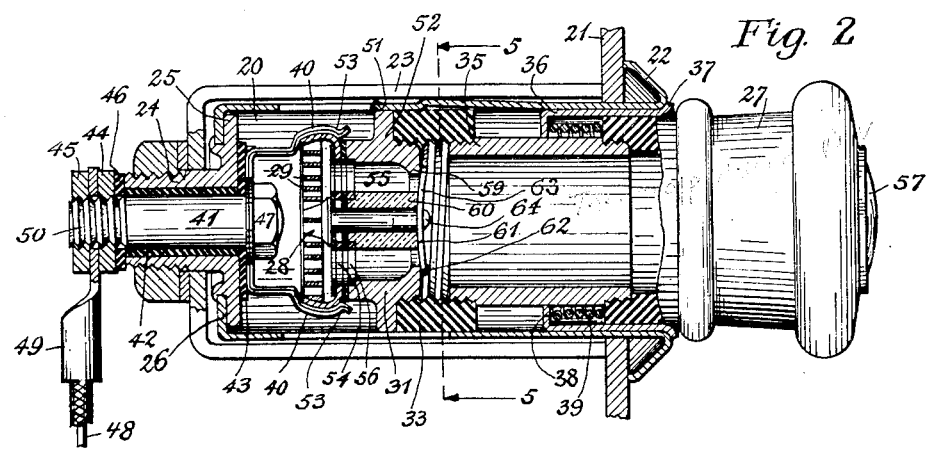
Fig. 2 is a similar view, but with the igniting unit in closed-circuit position.
Figure 5:
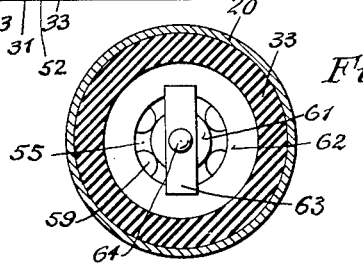

Fig. 5 is a transverse section taken on the line 5—5 of Fig. 2.

Fig. 6 is a fragmentary axial sectional view showing another embodiment of the present invention, the igniting unit being in open-circuit position and having a spring switch arm normally biased to open the circuit, but held in closed-circuit position by a meltable element.

Fig. 7 is a similar section of this embodiment, showing the igniting unit in closed-circuit position, and showing the meltable element as having become soft and having released the spring switch arm to open-circuit position in response to dangerous overheating of the heating element due to failure of the bimetallic circuit opener.

Fig. 8 is a transverse section taken on the line 8—8 of Fig. 6.

Fig. 9 is a fragmentary sectional view of another embodiment of the invention, wherein a spring switch arm is carried by the body of the igniting unit, said arm being held in closed-circuit position by a meltable member carried by the heating element.

Fig. 10 is a similar sectional view of the embodiment of Fig. 9, but showing the heating element as dangerously overheated, and showing the meltable member as having become soft and having released the spring switch arm to open-circuit position.

Fig. 11 is a transverse section taken on the line 11—11 of Fig. 9.

As shown in the accompanying drawings, the present invention is applied to an automatic cigar lighter of the type in which the igniting unit is completely removable from the holding device for use. In the particular lighter illustrated, the holding device comprises a well or socket 20 adapted to be mounted in a hole in an instrument board 21 of an automobile, with a flange 22 of the well in engagement with the face of the instrument board. The well is secured in place by a U-shaped clamp 23 apertured to slide over a boss 24 extending from a plate 25 secured to the bottom 26 of the well.

The igniting unit is a generally cylindrical member adapted to fit the cylindrical well 20, and has a handle portion 27 projecting from the well, by means of which the igniting unit is grasped for operation and handling in use.

At its inner end, the igniting unit is provided with a heating element 28 in the form of a coil of resistance wire 29, which upon energization is made hot—usually incandescent—so that when it is applied to the end of a cigar or cigarette it will ignite the same. The resistance wire 29 is carried in a cup 30 suitably mounted on a heating element cap 31, which body is provided with a screw-threaded portion 32 engaging internal threads of a collar 33, preferably of insulating material, of the igniting unit. It is by means of the screw-threaded connection 32 that the heating element is removably mounted on the igniting unit so that it may be replaced if desired.

The igniting unit is made up of several other parts, including a sleeve 35 usually of metal, which is externally threaded to screw into the insulating collar 33, said sleeve having threaded on its outer or forward end the handle or knob 27. In addition to this, the igniting unit includes an ejecting member in the form of a sleeve 36 slidably mounted on the sleeve 35 and the handle portion 27. At the outer end, the sleeve 36 has a flange 37 adapted to engage the flange 22 of the holding well when the igniting unit is in position in said well. At its other end, the sleeve 36 has a flange 38 extending inwardly and adapted to slide on the sleeve 35 in the space thereof between the insulating member 33 and the end of the knob or handle 27. Normally the sleeve 36 is located in the position shown in Fig. 1, wherein the flange 38 engages the front edge of the insulating member 33, and said sleeve is held in this position by an expansion spring 39 which is tightly compressed when the igniting unit is moved from its normal open-circuit position shown in Fig. 1 to its closed-circuit position shown in Fig. 2.

As stated above, the cup 30 encloses the heating wire 29, but in addition it is also connected to the outer convolution of said wire to constitute one contact of the igniting unit in the circuit including the heating wire. The other contact of the igniting unit is constituted by the heating element body 31 which engages the wall of the well 20. Usually the well is grounded on the motor vehicle by reason of the engagement with the instrument board 21, but if for any reason it is not connected to the battery through grounding, a suitable wire from a grounded portion of the automobile may be connected in any way desired to the well.

Within the shell 20, and in position to be engaged by the cup 30, are contacts 40 secured to the bottom plate 25 by a stud 41. The stud is insulated from the boss 24 by a sleeve of insulating material 42, and the contacts are insulated from the plate 25 by an insulating washer 43. The stud 41 projects beyond the boss 24 and at its outer end is provided with nuts 44 and 45. The nut 44 is insulated from the end of the boss 15 by an insulating washer 46, and when the nut 44 is tightened, the head 47 draws the contacts 40 and insulating washer 43 tightly against the bottom plate. The wire 48 from the battery or other suitable source of current is usually provided with a lug 49 carried by the threaded end 50 of the stud 41 and is clamped in firm electrical contact with the stud by the nut 45.

When the heating element of the igniting unit is to be connected to the source of current, so as to be energized and brought to incandescence for use, the knob portion 27 is pushed inwardly. This causes, in the form of the invention herein disclosed, the entire igniting unit to be moved inwardly, with the exception of the sleeve 36 which remains relatively stationary, causing the spring 39 to be compressed. In so moving inwardly, the cup 30 of the heating element is brought into engagement with the contacts 40 and at the same time positive electrical connection between the cap 31 of the heating element and the well is insured by a resilient tongue 51 lanced from the shell and engaging a flange 52 of the heating element cap 31, all as shown in Fig. 2.

In the device illustrated herein, when the cup 30 engages the contacts 40, the latter embrace the cup with sufficient resilience and firmness to hold the igniting unit to the energizing position of Fig. 2, due to the tension of the contacts 40 and due to engagement of the inwardly bent portions 53 of said contacts with the cup. The igniting unit is held in this position against the tendency of the spring 39 to return it to open-circuit position.

Figure 1:
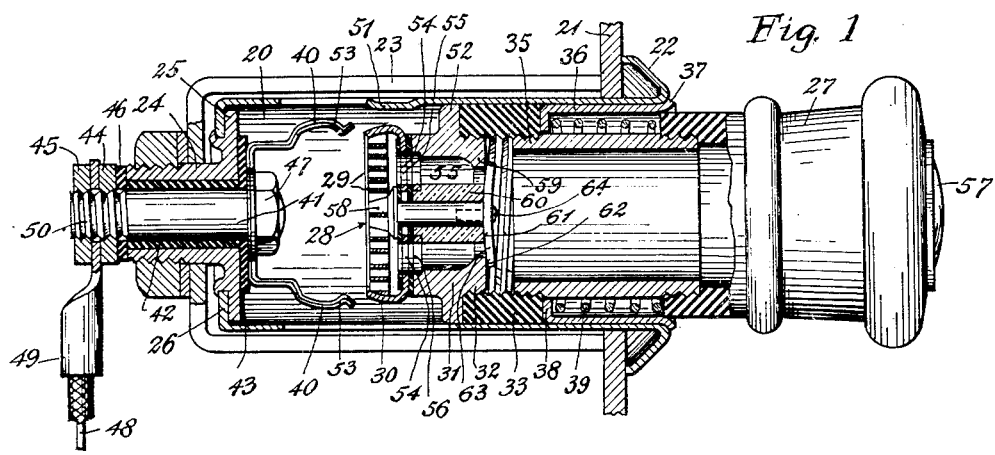
Figure 1 is an axial sectional view of an automatic cigar lighter embodying the present invention, the igniting unit being in open-circuit position and having a contact-bridging member held under tension by a meltable element.

As stated above, the cigar lighter illustrated herein by way of example is of the automatic type, and accordingly the contacts 40 are made of bimetallic material or of such other material that when the heating element has been brought to the desired temperature for use, the contacts 40 will have spread apart sufficiently to release the cup 30 from their grasp so as to allow the igniting unit to be returned to open-circuit position shown in Fig. 1 through the action of the ejecting spring 39. The igniting unit may then be taken from the holder so that the heating element 28 may be applied to the end of a cigar or cigarette to ignite the same.

With the automatic cigar lighter herein disclosed, when the driver of a vehicle desires to light a cigar or cigarette, he merely pushes in on the knob or handle 27 to bring the igniting unit into energized position. He then reaches into his pocket to obtain the desired cigar or cigarette, and during the few seconds required for this, the heating element is being brought to incandescence, after which the igniting unit moves to ejecting position shown in Fig. 1 with a slight clicking sound which indicates to the user that the heating element is ready for use. In addition to this signal, the knob 27 is usually made of translucent material and is in light-conducting relation with the heating element by virtue of the light-conducting channels 54, 55 and 56, respectively in the cup 30, heating element body 31, and sleeve 35, so that when the heating element is incandescent, said knob 27 or a portion thereof is made to glow. In the form shown, the knob 27 itself is made of a material substantially opaque, but the end of the knob has a lens 57 which is caused to glow by light emanating from the heating element. With the device thus far described, when functioning in its intended automatic manner with all parts working correctly, there is no danger of the cigar lighter becoming overheated, for when the heating element reaches the desired temperature, the bimetallic contacts 40 release the cup 30, and thus the igniting unit is moved by the spring 39 to open-circuit position.

Nevertheless, however carefully the parts of a cigar lighter may be constructed and assembled, there is present the possibility of damage and danger resulting from overheating of the heating element. In either automatic or non-automatic lighters this might be because of some abuse or improper use of the device by a user, or because of failure of the parts of the device properly to operate.

The present invention provides improved means for opening the circuit through the heating element when this dangerously overheats, regardless of the reason for said overheating, and this means includes an electrical switching or circuit-opening means in series with the heating element circuit, and includes heat-responsive means for maintaining said switching means in closed-circuit position, and which heat-responsive means is adapted to respond to dangerous overheating of the heating element, by releasing the switching means to open-circuit position.

In exemplification of this, the present invention provides a thermoplastic material in heat-receiving relation with the heating element, said material being associated with an electrical switching means in the heating element circuit in such a manner that softening or melting of the thermoplastic material in response to a predetermined dangerous degree of overheat of the element will result in functioning of the switching means to open the electrical circuit.

Several forms of the invention are illustrated herein as exemplary thereof. In one of these, that at present preferred, the heating element carries a pair of contacts insulated from each other, and carries a resilient bridging member electrically connecting said contacts and held in place by a thermoplastic stud or pin; another form of the invention includes a heating element having in its electrical circuit a spring-urged switch arm which is normally held in closed-circuit position by a thermoplastic member. Still another form of the invention provides a spring-urged switch arm, carried, not by the heating element, but by the igniting unit, said arm being held in closed-circuit position by a thermoplastic member carried by the heating element. The present preferred embodiment of the invention will be described first, attention being called to Figs. 1, 2, 3, 4 and 5.

It will be recalled that, as stated above, current is conducted through the heating wire 29 by the body 31 of the heating element. However, the cap 31 is not directly connected to the heating element, but is insulated therefrom and connected thereto through the intermediary of a contact-bridging member.

For this purpose, the inner convolution of the resistance wire 29 is connected to a stud 58 extending toward the handle portion 27 through the body 31 of the heating element, said body having a bore 55 and an apertured portion 59 at the rear of said bore. The stud 58 passes through the apertured portion 59 of the body 31 and is centralized therein by a suitable form of insulation such as a shouldered sleeve 60 of porcelain, lava, or other ceramic material, said stud passing through the sleeve, and both stud and sleeve being disposed in the bore 55 of the heating element body. The insulating sleeve 60 is slightly shorter than the body 31, so that its forward face 61 is inside of the forward face 62 of said body.

As provided by the present invention, the stud 58 carries at its forward end an elongate strip 63, preferably of spring metal, said strip being held by means of a thermoplastic pin 64 to the end of the stud, the head of the pin holding the strip in place. The strip 63 is adapted to act as a contact-bridging member, the ends of said strip pressing against the front face 62 of the heating element body 31. Since the front face 61 of the insulating sleeve 60, and the face of the stud 58 both lie inside of the face 62, when the bridging member 63 is secured in place by the pin 64, said member will be bent as shown, and will therefore firmly engage the face 62. Also, the bridging member 63 serves to hold the insulating sleeve 60 firmly against the apertured end portion 59 of the heating element body 31, and thus functions to firmly hold the stud 58, cup 30, and heating wire 29 to said body.

It will be noted that the heating element body 31 is insulated from the heating element except through the intermediary of the bridging member 63, which connects said body to the stud 58, and therefore to the inner end of the heating element.

The bridging member 63 is thus held, under tension, in engagement with the stud 58 and heating element body 31 by the thermoplastic pin 64, and, this thermoplastic pin is of a material which will respond to dangerous overheating of the heating coil 29 by becoming soft, or by melting. When such a condition occurs, the bridging member 63 will be released and will spring back to its original flat position, and in so doing will disconnect the stud 58 from the heating element body 31.

The pin 64 may be of any suitable material which responds to heat by becoming soft or by melting, and materials which might be used include lead, solder, and Tenite, the particular material chosen depending on the permissible degree of overheating of the element before the circuit is permanently opened by the bridging member 63, and depending on the heat conductivity between the pin 64 and the heating element.

When the lighter is in energizing position, current is carried to the cup 30 of the heating element by the contacts 40, then through the resistance wire 29 to the central post or stud 58, then through the bridging member 63 to the body portion 31 of the heating element and through the latter to the well 20. If the igniting unit should fail in its normal operation to move to open-circuit position, for any reason, so that the circuit remains closed (a condition such as this being shown in Fig. 4 wherein the bimetallic contacts 40 have failed to respond), the consequent overheating of the heating element will cause heat to be conducted through the stud 58 to the thermoplastic pin 64, and when a sufficient degree of heat has been applied to said pin it will melt or become soft, and release the bridging member 63 so that the circuit is opened.

It should be noted that the thermoplastic pin 64 may be of material which is either electrically conducting or electrically insulating. If the material of the pin is electrically conducting, complete opening of the heating element circuit will be effected only upon separation of the bridging member 63 from the body 31 of the heating element, as shown in Fig. 4. However, if the thermoplastic pin 64 is of a material which is non-conducting electrically, opening of the circuit can be effected by a mere slight softening of the material of said pin, the softening being sufficient only to permit the spring action of the bridging member 63 to flatten said member so as to separate the center portion of the member from the stud 58. Thus, for this latter condition, a slight elongation of the shank of the pin 64 will permit separation of the bridging member 63 from the stud 58, thus to open the heating element circuit. Or, upon the material of the pin 64 becoming slightly plastic in response to heat from the heating coil 29, the entire pin may be moved outwardly under the urging of the bridging member so that said member will separate from the stud 58, and in this event, the pin 64 being of insulating material, the circuit will be broken even though the pin still remain somewhat deep in the stud 58, and even though the bridging member 63 still be held against the front face 62 of the heating element body 31.

Due to overheating, the heating wire 29 and cup 30 and adjacent parts will in most cases be damaged to a point where they may not be safely used again. Accordingly, in the event that this occurs, it is deemed advisable in most instances to replace the entire heating element rather than the pin 64. According to the embodiment shown, the entire heating element may be removed by unscrewing the body 31 from the igniting unit, and a new heating element readily replaced without difficulty. However, if desired, the bridging member 63 may be replaced by using a new thermoplastic pin, without replacement of the entire heating element.

Another embodiment of the present invention is illustrated in Figs. 6, 7, and 8, wherein the heating element carries a spring urged contact arm which is held in closed-circuit position by a thermoplastic washer.

As shown, the heating coil 29 and enclosing cup 30 are carried on a metallic heating element body 31a screwed into an insulating annulus 33 of the igniting unit. The inner end of the heating coil 29 is connected to a stud 58a passing through the heating element body 31a and centrally positioned therein by an insulating member 60a of suitable material such as lava, porcelain, or other ceramic substance. The insulating member 60a has an outer cylindrical portion closely fitting within the bore of the heating element body 31a, and a central sleeve portion surrounding the stud 58a. Thus the stud 58a is insulated from the heating element body 31a.

For the purpose of effecting electrical connection between the stud and heating element body in such a manner that overheating of the heating element will cause a breaking of said connection, there is provided by the present invention a spring contact arm 63a which is angular in shape, said arm being carried by means of a screw 65 on a head 66 in turn screwed into the stud 58a. The arm 63a extends into the bore of the body 31a and is biased away from the walls of said bore, but is held in engagement with said walls by a thermoplastic washer 67 disposed between the head 66 and the stud 58a, and pressing against the arm 63a. The washer 67 not only holds the arm 63a in firm engagement with the body 31a, but also holds the insulating member 60 firmly against the body 31a and thus serves to rigidly position the heating coil 29 and cup 30 on said body.

If, as illustrated in Fig. 7, the bimetallic contacts 40 should fail to open at the proper time during energization of the heating element, so that overheating of said element takes place, the heat therefrom will be transmitted by the stud 58a to the thermoplastic washer 67, causing the latter to melt or become soft, as shown. This will permit the inwardly biased contact arm 63a to move away from the heating element body 31a, thereby opening the circuit through the element.

Preferably the head 66 is provided with an intermediate cylindrically reduced portion or neck, as shown, so that heat from the stud 58a will not be readily transmitted to the spring contact arm 63a, thereby insuring that said arm retains its resiliency.

Another embodiment of the present invention is shown in Figs. 9, 10, and 11, wherein there is illustrated a circuit-opening arrangement somewhat similar to that of the embodiment just described, except that the biased switch arm is carried by the igniting unit rather than by the heating element.

As illustrated, the heating coil 29 and cup 30 enclosing said coil are mounted on a heating element body 31b by means of a central contact stud 58b said stud being connected with the inner end of the heating coil and electrically connecting said end to the body 31b. The heating element body is screwed into the insulating portion 33 of the igniting unit, said body however having an external flange which does not slidably fit within the shell 20, but which is spaced therefrom so as to be out of electrical and mechanical engagement therewith.

According to this embodiment, an electrical circuit between the inner end of the heating coil 29 and the shell 20 is effected through a sleeve 35b of the igniting unit, by means of a connection between said sleeve and the heating element body 31, this connection being controlled in such a manner that overheating of the heating element will electrically disconnect said sleeve and body.

As shown, the shell 35b has a tongue 68 lanced therefrom and extending inwardly, said tongue having screwed thereto a spring contact arm 63b extending rearwardly of the igniting unit and having an outwardly extending lip 87 engaging the inner wall of the heating element body 31b. The contact arm 63b is biased inwardly so that it is urged away from the body 31b, but said arm is maintained in engagement with said body by means of a thermoplastic washer 67b carried on a stud 88 screwed into the stud 58b. The spring contact arm 63b is positively insulated from the stud 88 and thermoplastic washer 67b by means of an insulating shoe 89 carried on said arm.

When the igniting unit is in closed-circuit position, electrical connection will be effected from the heating coil 29 through the stud 58b, heating element body 31b, contact arm 63b, sleeve 35b, and sleeve 36 to the well 20. For the purpose of effecting positive electrical connection between the sleeve 35b, sleeve 36 and the well 20, the latter is provided with a tongue 90 lanced therefrom and biased inwardly to press against the sleeve 36.

It will be noted that, as provided by this embodiment, the spring contact arm 63b is removed from the vicinity of heat from the coil 29, and therefore there is no tendency for said arm to lose its resiliency and function improperly.

As shown in Fig. 10, overheating of the heating element will cause softening or melting of the washer 67b which softening will allow the contact arm 63b to move away from the heating element body 31b, thereby breaking the electrical circuit through the heating element.

Assembly of the heating element on the igniting unit is facilitated by beveling the inner edge of the heating element body 31b, as at 91, and by providing an inclined plane surface 92 on the arm 63b, as formed by the lip 87 and the insulating shoe 89 of said arm. Thus, when the heating element is screwed in the igniting unit during assembly, the thermoplastic washer 67b will engage the surface 92 and force the inwardly biased contact arm 63b outwardly so as to permit entrance of said washer. Also, the beveled edge 91 of the heating element body 31b will guide the edge of the lip 37 so that said body may be tightly screwed into the insulated portion 33 with the lip 87 in firm engagement with said body.

Variations and modifications may be made within the scope of this invention and portions of the improvements may be used without others.

I claim:

1. In a cigar lighter, a holding device; a removable igniting unit adapted to be supported in the holding device and completely removable therefrom for use, said igniting unit comprising a body; a heating element secured to the body; a contact electrically connected to one end of the heating element for engaging a holding device contact; a second contact comprising a contact member carried by the body to be electrically connected to a second contact on the holding device; a heat-conducting current-carrying member connected to the remaining end of the heating element and extending into predetermined spaced relation with the contact member carried by the body; an electric conductor for bridging the contact carried by the body and the heat-conducting current-carrying member; and fusible means in heat-receiving relation with the heating element for holding said conductor in engagement with the contact carried by the body and the heat-conducting current-carrying element, whereby overheating of the heating element will cause melting of the fusible means to release said bridging conductor so that the circuit through the element will be opened, said fusible means comprising a thermoplastic pin passing through the bridging conductor and securing the same to the heat-conducting current-carrying element.

2. In an electric cigar lighter comprising an electric circuit, one of said parts being a holding device and the other of said parts being an igniting unit supported and completely removable from the holding device for use; a heating element carried by the igniting unit; electric circuit means having a pair of contacts carried by the holding device; a pair of cooperating contacts on the igniting unit for completing an energizing circuit through the heating element; means for closing the circuit between the contact upon operation of at least a part of the igniting unit, said circuit means including a pair of contacts carried by one of the parts in spaced relation with one another to form a gap; a bridging member for closing the gap between the contacts and yieldingly urged into open-circuit position; a thermoplastic means for holding the bridging member against the urging means, said thermoplastic means being electrically conducting and in the energizing circuit for the heating element and adapted to, upon overheating of the heating element, soften so that the bridging member is released for movement by the urging means into a position to open the energizing circuit.

3. The invention as defined in claim 9, wherein the heating element is removably mounted on the igniting unit and the contacts, bridging member therefor, and thermoplastic means are carried by the heating element.

4. The invention as defined in claim 9, in which the contacts forming the gap, the bridging member and the thermoplastic means is carried by the igniting unit.

5. The invention as defined in claim 9, in which the thermoplastic means comprises a thermoplastic washer.

6. The invention as defined in claim 9, in which the thermoplastic means comprises a thermoplastic element which is electrically conducting and included in the electrical circuit for the heating element so as to carry the current in said circuit.

7. The invention as defined in claim 9, in which the thermoplastic means comprises a thermoplastic pin of electrical insulating material.

8. The invention as defined in claim 9, wherein one of the circuit-closing contacts comprises a heat-controlled contact normally operable to open the circuit before the thermoplastic means is heated to soften and open the circuit.

9. An electric cigar lighter comprising essentially two parts, one of said parts being a holding device and the other of said parts being an igniting unit supported by and completely removable from the holding device for use; a heating element carried by the igniting unit; electric circuit means having a pair of contacts carried by the holding device and a pair of cooperating contacts on the igniting unit for completing an energizing circuit through the heating element; means for closing the circuit between the contacts upon operation of at least a part of the igniting unit, said circuit means including a pair of contacts carried by one of the parts in spaced relation to one another to form a gap; a bridging member for closing the gap between the contacts and yieldingly urged into open-circuit position; and thermoplastic means for holding the bridging member in closed-circuit position against the urging means, said thermoplastic means being in heat-receiving relation with the heating element and adapted to respond to overheating of the heating element by softening so that the bridging member is released for movement by the urging means into a position to open the energizing circuit.

10. The invention as defined in claim 9, in which the thermoplastic means comprises a washer carried by the heating element, the edge of the washer engaging the yieldingly urged bridging member.

11. In a cigar lighter, a removable igniting unit adapted to be supported in a holding device to receive energy therefrom, comprising a heating element; a body to which the heating element is secured; a contact connected to one end of the heating element, for engaging a holding device contact; a second contact comprising a metallic ring carried by the body to engage a second holding device contact; a heat-conducting stud connected with the remaining end of the heating element and extending through the ring; an electrical conductor for bridging the ring and the stud; and fusible means in heat-receiving relation with the heating element for holding said conductor in engagement with the ring and stud whereby overheating of the element will cause melting of the fusible means to release said bridging conductor so that the circuit through the element will be opened, said fusible means comprising a thermoplastic pin passing through the bridging conductor and securing same to the stud.

12. A heating element for a cigar lighter comprising a coil of heating wire; a contact attached to one end of the wire; a second contact comprising a ring; means for holding the contacts in fixed relation; an electrical connection member attached to the remaining end of the wire and comprising a heat-conducting stud extending through the ring; an electrical conductor comprising a metal strip for bridging the connection member and second contact; and fusible means comprising a thermoplastic pin in heat-receiving relation with the heating element for holding the strip to the stud in its bridging position whereby overheating of the element will cause melting of the fusible means to release said conductor so that the circuit through the element will be opened.

13. A heating element for a cigar lighter comprising a coil of heating wire; a contact attached to one end of the wire; a second contact comprising a ring; means for holding the contacts in fixed relation; an electrical connection member attached to the remaining end of the wire and comprising a heat-conducting stud extending through the ring; an electrical conductor comprising a metal strip for bridging the connection member and second contact; and fusible means comprising a thermoplastic pin of electrically conducting material in heat-receiving relation with the heating element for holding the strip to the stud in its bridging position whereby overheating of the element will cause melting of the fusible means to release said conductor so that the circuit through the element will be opened.

14. A heating element for a cigar lighter comprising a coil of heating wire; a contact attached to one end of the wire; a second contact comprising a ring; means for holding the contacts in fixed relation; an electrical connection member attached to the remaining end of the wire and comprising a heat-conducting stud extending through the ring; an electrical conductor comprising a resilient metal strip placed diametrically across the ring for bridging the connection member and second contact; and fusible means comprising a thermoplastic pin in heat-receiving relation with the heating element for holding the strip to the stud in its bridging position and under tension whereby overheating of the element will cause melting of the fusible means to release said conductor so that the circuit through the element will be opened.

15. A heating element for a cigar lighter comprising a coil of heating wire; a contact attached to one end of the wire; a second contact comprising a ring having external threads for mounting it on the removable igniting unit of the cigar lighter; means for holding the contacts in fixed relation; an electrical connection member attached to the remaining end of the wire and comprising a heat-conducting stud extending through the ring; an electrical conductor comprising a metal strip for bridging the connection member and second contact; and fusible means comprising a thermoplastic pin in heat-receiving relation with the heating element for holding the strip to the stud in its bridging position whereby overheating of the element will cause melting of the fusible means to release said conductor so that the circuit through the element will be opened.

16. In a cigar lighter, a removable igniting unit adapted to be supported in a holding device, comprising an elongate plug-like body having a longitudinal light channel therein; a heating element; means for securing the heating element to one end of the body so that light therefrom can pass through the longitudinal channel; an electrical contact on the body of the igniting unit, adjacent the heating element; an electrical connection member for connecting said contact with one end of the heating element, said connection member being carried in the channel of the igniting unit and being adapted to permit light from the heating element to pass by it to traverse the entire length of the channel; and fusible means in heat-receiving relation with the heating element for holding said connection member in engagement with said contact whereby overheating of the element will cause melting of the fusible means to release said member so that the circuit through the element will be opened.

HERBERT G. LEHMANN.